(12) United States Patent
Bransfield, Jr.

(10) Patent No.: US 10,277,684 B2
(45) Date of Patent: Apr. 30, 2019

(54) PERSONALLY-WEARABLE INTERNET OF THINGS MICROCONTROLLED DEVICE

(71) Applicant: WarCollar Industries, LLC, Vienna, VA (US)

(72) Inventor: Eugene J Bransfield, Jr., Vienna, VA (US)

(*) Notice: Subject to any disclaimer, the term of this patent is extended or adjusted under 35 U.S.C. 154(b) by 207 days.

(21) Appl. No.: 14/853,964

(22) Filed: Sep. 14, 2015

(65) Prior Publication Data

US 2016/0156720 A1 Jun. 2, 2016

Related U.S. Application Data

(60) Provisional application No. 62/050,173, filed on Sep. 14, 2014.

(51) Int. Cl.
| | |
|---|---|
| G06F 15/16 | (2006.01) |
| H04L 29/08 | (2006.01) |
| G06F 1/3234 | (2019.01) |
| G06F 21/31 | (2013.01) |
| G01S 19/14 | (2010.01) |
| G06F 8/654 | (2018.01) |
| H04W 4/02 | (2018.01) |
| H04W 4/20 | (2018.01) |
| H04W 4/80 | (2018.01) |

(52) U.S. Cl.
CPC ............ *H04L 67/141* (2013.01); *G01S 19/14* (2013.01); *G06F 1/3243* (2013.01); *G06F 8/654* (2018.02); *G06F 21/31* (2013.01); *H04L 67/12* (2013.01); *H04W 4/02* (2013.01); *H04W 4/20* (2013.01); *H04W 4/80* (2018.02); *Y02D 10/152* (2018.01); *Y02D 10/42* (2018.01)

(58) Field of Classification Search
CPC ........................................................ G01S 19/42
USPC ........................................................ 709/227
See application file for complete search history.

(56) References Cited

U.S. PATENT DOCUMENTS

| | | | | |
|---|---|---|---|---|
| 2001/0047514 | A1* | 11/2001 | Goto | G06F 8/65 717/170 |
| 2004/0033812 | A1* | 2/2004 | Matsunaga | G06F 1/263 455/557 |
| 2007/0030824 | A1* | 2/2007 | Ribaudo | G01S 5/0018 370/328 |
| 2009/0189811 | A1* | 7/2009 | Tysowski | G01S 19/14 342/357.34 |
| 2013/0226692 | A1 | 8/2013 | Kouladjie et al. | |
| 2013/0318594 | A1* | 11/2013 | Hoy | H04L 63/0272 726/15 |
| 2014/0094187 | A1* | 4/2014 | LaMarca | G01S 5/0236 455/456.1 |
| 2014/0172351 | A1* | 6/2014 | Barfield | G01C 5/06 702/138 |
| 2014/0201532 | A1 | 7/2014 | Toy et al. | |

(Continued)

*Primary Examiner* — Hamza N Algibhah
(74) *Attorney, Agent, or Firm* — Radlo IP Law Group; Edward J. Radlo

(57) ABSTRACT

An internet of things device containing a memory device, GPS antenna, Wi-Fi connection, microcontroller and power source that is in a mobile, compact, flexible form factor. System units can execute specific functionality it is programmed and can be easily reprogrammed by a user. A system unit can connect to the internet through various means based on the components contained within the system unit to include cellular data, Bluetooth and other wireless protocols to execute functions.

10 Claims, 10 Drawing Sheets

(56) References Cited

U.S. PATENT DOCUMENTS

| | | | |
|---|---|---|---|
| 2015/0079985 A1* | 3/2015 | Vuchula | H04W 48/16 455/435.1 |
| 2015/0103806 A1* | 4/2015 | Kuusilinna | H04W 64/00 370/332 |
| 2015/0148868 A1 | 5/2015 | Shahandeh et al. | |
| 2015/0278073 A1* | 10/2015 | Carson | G06F 11/3636 714/38.11 |
| 2015/0326610 A1* | 11/2015 | Bartoszewski | H04L 41/0813 726/1 |
| 2018/0048674 A1 | 2/2018 | Black et al. | |
| 2018/0077196 A1 | 3/2018 | Itikarlapalli et al. | |

* cited by examiner

FIG. 4

Example User Code Creation and Website Upload Procedures:

1.) User wishes to create custom program for the product
2.) User logs into the website with appropriate credentials
    a. User is presented with profile page and list of registered products
3.) User chooses to go to the developer's page
    a. User is presented with an IDE for software creation
4.) User creates the software
5.) User compiles software into a deployable software package
6.) User selects which product to work with
7.) User places the system unit into a flashable state
8.) User chooses "Flash New Software" on the website
    a. User is presented with different software packages to flash to the product
9.) User selects the newly created custom software to flash to the product
10.) User hits "Flash" icon on the website
11.) Product downloads new software, reboots, and is ready for use.

FIG. 5

Example Basic Wi-Fi Scanning Procedures:

1.) Turn On Wi-Fi chip
2.) Obtain a GPS lock
    a. If no GPS lock, repeat step 2 process until GPS lock
    b. If GPS lock, record date, time, latitude, and longitude
3.) Attempt to detect any Wi-Fi access points in range of the system unit,
    a. If no Wi-Fi signals detected, record none are detected and skip to step 5
    b. If Wi-Fi signals are detected
        i. Record number of SSIDs
            1. For each SSID
                a. Record with the GPS lock information the latitude, and longitude of detected access point, SSID, BSSID, Signal Strength, and Encryption Algorithm, and to memory storage unit
4.) Turn off Wi-Fi chip
5.) Put microcontroller into sleep mode for a specified period of time
6.) Repeat.

FIG. 6

Example Data Upload Procedures:

1.) Start with Spark Core disconnected from Cloud/Internet with Wi-Fi Chip off
2.) Attempt to get GPS lock (including time, date, latitude, and longitude)
    a. Get a GPS lock
        i. If no GPS lock, repeat process until GPS lock
        ii. If GPS lock, get date, time, latitude, and longitude
3.) Turn On Wi-Fi chip
    a. Conduct a Wi-Fi Scan to gather data regarding detected Wi-Fi access points in the area
        i. If Wi-Fi Access point is open or known Wi-Fi access point is in range
            1. Read data from the memory storage unit or firmware and upload to pre-configured website/external storage area
4.) Turn off Wi-Fi Chip.
5.) Microcontroller placed into a sleep mode for a specified period of time (this step is intended to reduce power consumption and can be adjusted or eliminated depending on circumstances).

FIG. 9

Example Captive Portal Advertisement Procedures:

Note: May require offline pre-configuration of website to be displayed

1.) Start Product with website configuration embedded on device
2.) Turn on Wi-Fi Chip
3.) Broadcast system unit SSID to allow connections to system unit
4.) If device requests connection to system unit
    a. Optional prompt for password
    b. Allow access
5.) Request contact information to access website
    a. Validate proper entry of email address
        i. False: Present error message
        ii. True: Continue
6.) Present website
    a. Optional Bio of representative
    b. Presentation of Coupon or other reward
7.) Logout or timeout after certain period of time
8.) Repeat from step 3

FIG. 10

Example Captive Portal Convention Procedures:

Note: May require offline pre-configuration of data to be provided

1.) Enable offsite populated database
2.) Start system unit with database communication configuration
3.) Turn on Wi-Fi Chip on system unit and establish connection with offsite database
4.) Broadcast system unit SSID to allow connections to system unit
5.) If device requests connection to system unit
    a. Optional prompt for password
    b. Allow access
6.) Present data from central database
    a. Description of company
    b. Job listings
    c. Information for download
    d. Opportunity to upload resume to database
7.) Logout or timeout after certain period
8.) Repeat from step 4

PERSONALLY-WEARABLE INTERNET OF THINGS MICROCONTROLLED DEVICE

CROSS-REFERENCE TO RELATED APPLICATIONS

This application claims the benefit of U.S. Provisional Application No. 62/050,173, filed Sep. 14, 2014, the content of which is hereby incorporated by reference in its entirety

FIELD OF THE INVENTION

The present invention relates to a mobile, small form factor, internet of things device containing a microcontroller connected to a Wi-Fi access device, GPS unit, and memory card.

BACKGROUND OF THE INVENTION

Current internet of things (IoT) devices tend to be designed for a single, specific use or require extensive programming capabilities to modify the intended use. The invention addresses the shortcomings of mobile IoT devices currently available to users. The invention allows for multipurpose and easily reprogrammable IoT device to meet user needs.

BRIEF SUMMARY OF THE INVENTION

The system is an invention that puts a microcontroller, memory card, and a wireless communications access unit into a small, mobile form factor that can be easily carried about. Some examples of form factors include an animal collar, ID lanyard, nametag or clothing such as shirts, belts, hats, or other wearable items. Each mobile embodiment of the system is called a system unit. The microcontroller of a system unit is configured to perform a base set of functions, but is programmable to allow a user to change the behavior of the system. Additional peripherals can be added to alter system functionality. Alternative components for communications methods include, but are not limited to, cellular data, Bluetooth™, and Near Field Communication (NFC). System units can also control and interact with other devices that a system unit can establish a connection with.

BRIEF DESCRIPTION OF THE DRAWINGS

FIG. 4 illustrates an example for creating and flashing a user created program to a system unit.

FIG. 5 illustrates an example Wi-Fi scanning procedure.

FIG. 6 illustrates an example data upload procedure.

FIG. 9 illustrates an example captive portal advertisement procedure.

FIG. 10 illustrates an example captive portal convention procedure.

DETAILED DESCRIPTION

Figure 1:
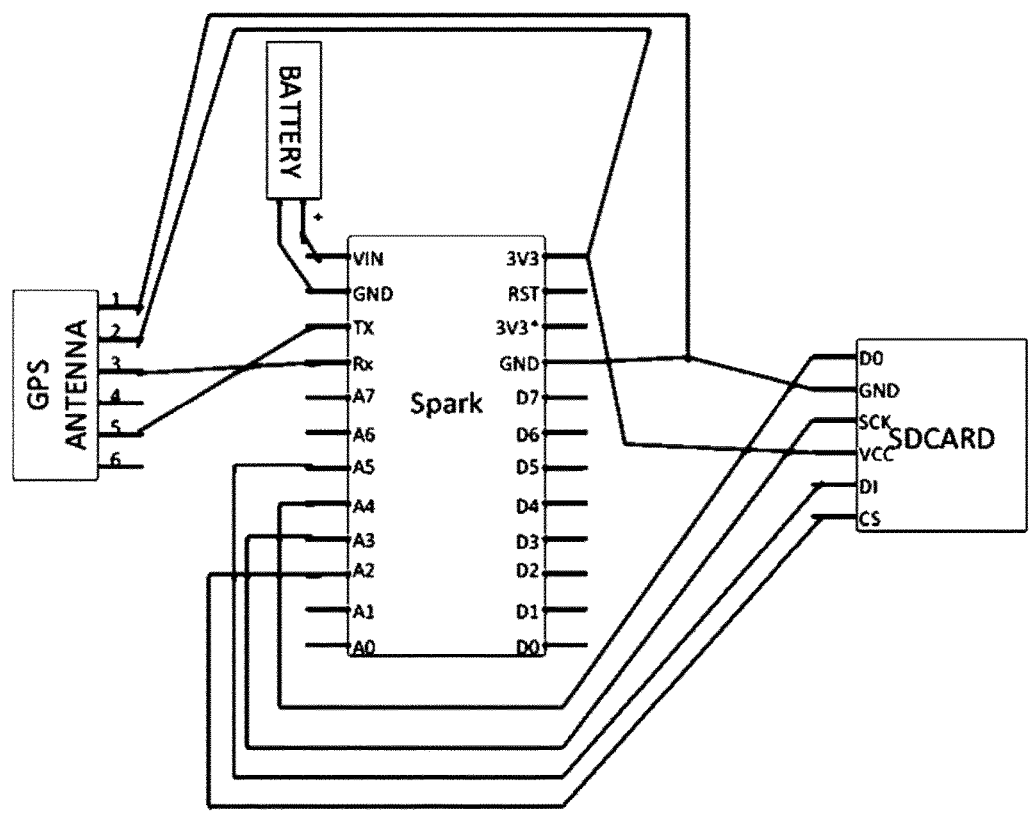
FIG. 1 illustrates an embodiment in which components may be connected directly to a Spark microcontroller.

A specific example construction of the portable system unit utilizes a Spark Core microcontroller with embedded TI CC3000 Wi-Fi solution; a GP-635T GPS Antenna, JST SH Jumper 6-wire, (1ft); a MicroSD Breakout Board; and an appropriate power source. A connection diagram of this embodiment is displayed in FIG. 2. Alternative components can be substituted in, such as different antennas, microcontroller boards, and connection solutions, or the microcontroller and alternative components can be replaced with a system on a chip (SOC) or a System in a Package (SOP). The Spark Core microcontroller, which is programmable, is connected to a GP-635T GPS antenna via the RX connector on the Spark Core to the Pin 3 on the GP-635T GPS antenna. The GPS antenna gets power from the Spark Core by connecting GPS antenna Pin 1 to the Spark Core GND and GPS antenna Pin 2 to the Spark Core 3V3. Optionally, the GPS antenna pin 5 can be connected to the Spark TX pin. The GPS antenna listens to transmissions broadcast from the fleet of GPS satellites orbiting the earth. The GPS antenna feeds that information via the serial connection to the RX pin on the Spark Core microcontroller. In some embodiments, the TinyGPS++ software libraries on the Spark Core translate that information into date, time, latitude, and longitude. In some embodiments, the information can comprise acceleration, altitude, direction, and other pertinent location and movement data.

The Spark Core microcontroller device connects to the SparkFun MicroSD Breakout Board by connecting the Spark Core A5 pin to the Breakout Board DI chip; connecting the Spark A4 chip to the Breakout Board DO pin; connecting the Spark A3 pin to the Breakout Board SCK pin; connecting the Spark Core A2 pin to the Breakout Board CS pin; and providing power by connecting the Spark Core GND to the Breakout Board GND and the Spark 3v3 pin to the Breakout Board VCC pin. In some embodiments, the SD card is utilized to record data collected by the solution. In some embodiments, the SD card can be utilized to store data for later upload to the internet or store code to allow other functionality performed by the solution. A system unit includes appropriate connection of all components, such as by soldering. Configuration of a system unit also includes arrangement of components to fit inside an appropriately-sized container or attachment solution that is compatible with an intended recipient object.

The Spark Core allows a wide range of coding possibilities, to include uploading information to the Internet, hosting a web server, and executing code resident on a memory card. The uses for this solution are limited only by the storage capabilities of the solution, the ingenuity, and skill of the developer.

Additional application databases for programming a system unit can be contained on a website or external database. An external database allows users to create solutions to meet the needs of a user without burdening every system unit with applications for developing or modifying programming. This embodiment also makes applications available to a wider audience in a central repository.

In some embodiments the central database can be an application store ("app store") and functions as a digital distribution platform of applications to users. An online embodiment of the app store allows users to browse different app categories, types and view information regarding the apps such as description of designed functionality, reviews, rating. The users can also acquire these apps from the app store either for no cost or for purchase. The app store can include functionality to assist in the installation of the app to include removal of previous versions and in some conditions help assist against malware. User designed apps and programs can also be uploaded to the app store for distribution as well.

In some embodiments, a system unit includes a microcontroller such as a Spark Core or an Arduino microcontroller; a component for Wi-Fi capability such as a Texas Instruments CC3000; a component for GPS capability such as a GP-635T GPS antenna; a small memory storage unit such as a Micro SD card which may be removable for accessing data on the memory storage unit if necessary; and a power source such as a battery. In some embodiments, other components can be added, replaced, or omitted as applicable, such as a cellular data capability, indicator lights, Bluetooth™ capability, accelerometers, or a NFC unit. FIG. 1 illustrates how components, such as a Bluetooth™ and accelerometers may be connected directly to the microcontroller in addition to basic system unit components previously mentioned. Components may be connected to each other. Components may be in a series or parallel configuration with respect to each other or to the microcontroller. The components together create a small form factor. The form factor is small enough such that it can be hidden from view in when integrated into structures such as being small enough to fit inside a collar worn by a cat or dog or fit inside or attached to a watch band or in a lanyard worn by a person.

Methods for accessing information from the memory storage unit are generally through wireless means; however, direct physical access to the memory storage unit is also an option. Physical access can be achieved by removing the memory storage unit and inserting it into an appropriate memory card reader to access the data contained on the memory card if wireless access is inoperable. For wireless access, the Wi-Fi capability of the system unit can be used. In some embodiments, the system unit can include alternative wireless communication protocols or components allowing access to data resident on a memory storage unit. Each wireless access method can allow for data transfer to and from the system unit to external repositories to include the Internet, computers, or databases. In some embodiments data can be transmitted by Wi-Fi using Virtual Private Networks. Wireless communication methods can also be used to access other system unit components to include the microcontroller, GPS unit, or any other components that are part of the system unit. This allows for reprogramming of components, retrieving data from sensors, and sending data to any of the components contained within the system unit. These physical and wireless communications means can also be used to send commands to the system unit to initiate testing sequences or change settings in the system unit. System unit components containing wireless capabilities can also communicate with each other within a single system unit. In some embodiments, a system unit can communicate with other system units through wireless communications means to relay instructions, programs, or data to between system units.

The microcontroller can be programmed to perform multiple functions. Instructions contained on the memory storage unit can be executed each time the microcontroller accesses the memory storage unit. Instructions can also be executed when access is initiated by another program or the occurrence of an event. Examples of events that trigger programs can include passage of a preset period of time, movement of a set distance, or a sensor activation. Programs include hardwired applications, software, and firmware contained on microcontroller, data storage unit, or other system unit components.

A feature of the invention is the ease with which it can be reprogrammed by a user. In some embodiments, users with sufficient knowledge can create customized code to reprogram a system unit by conventional programming means. In other embodiments, the system can be connected to a software solution that allows for selection of pre-programmed applications or application components to add, remove, or modify specific functionality, or to build new functionality. This embodiment allows people without extensive programming capabilities to develop customized programs to meet their own needs. The applications can be contained in a central location such as a webserver or database that users can connect to through proprietary software or through a website interface. The proprietary software can be an app store program. Additionally, applications can be provided to the users by other methods such as by e-mail or preprogrammed memory storage units. A central database can be enabled to allow users to upload their own applications to share with other users.

Figure 3:
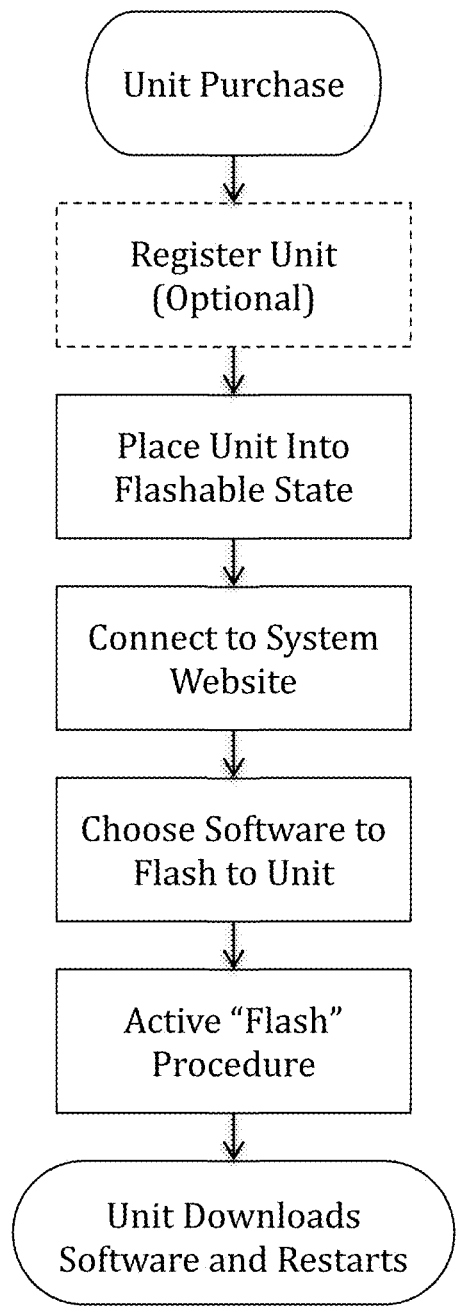
FIG. 3 illustrates an example for programming a system unit.

An exemplary embodiment of steps for programming a system unit are illustrated in FIG. 3. A user who purchases a system unit can register the unit on the product registration website. The user places the unit in a state where the product is ready to flash to new programming. This can be a manual process or can be programmed to be an automatic setting contained in the microcontroller or data storage unit that triggers any time the system unit is connected to the product website. On the website, database, or app store, the user will be presented with different software, applications, and/or application add-ons to choose from. Selection can be by any conventional means used to select options on a website to include drag and drop, selection from a check list, and drop down menus. The user chooses appropriate software to flash to the product. The user selects to flash to the new software. The system unit receives the new programming, installs it, reboots, and is ready for use.

If a user wishes to re-flash to a different software, applications, or purpose, the steps would be near identical to those previously mentioned and outlined in FIG. 3. The user simply connects to the database or website from where they wish to obtain the application, select the application, and flashes to the new application to the system unit.

A user may follow the exemplary embodiment of FIG. 4 for creating and flashing a user created program to a system unit. To create custom software or code; a product website or server with standard selection processes used on a website can be used for selecting application features to be combined to create a program. Traditional programming methods can be used to create a program or desired features if those features are not available on the website.

Alternative to using a development section on the website, if a programmer has already created code, the programmer can simply copy and paste or upload the code to the website through normal methods. Any time a user desires to use the custom created code, the user can do so through the same method as any accessing or reprogramming to an application or software already resident on the product website.

Another method for loading custom programming onto a system unit is by loading a programming interface on a local computer. This method allows for reprogramming of a system unit when connections to the product website cannot be established. In this instance the user would not establish a connection to the product website, but would establish a connection between the system unit and where the application to be flashed to is resident. This can be established by programming the new application or previously downloading system unit applications to the local computer. Transfer of applications from the local computer to the system unit can be achieved through physical connection, loading the applications onto a memory card and in inserting it in the system unit, or by wireless connection to the system unit.

A function, outlined in FIG. 5, is to conduct scanning for Wi-Fi signals and access points similar to war driving. When the Wi-Fi scanning procedure is initiated, the Wi-Fi chip is enabled, if the Wi-Fi chip is not already enabled by another program. The microcontroller obtains a GPS lock by means of the GPS antenna and records the time when the GPS lock is obtained. If a GPS lock cannot be obtained, the system unit can record each attempt and any pertinent information. Pertinent information can include alternative location information such as locations derived from accelerometers to determine distances traveled from the previous GPS lock, a known location, or locations computed by other means to include triangulation from transmitters such as Wi-Fi access points and/or cellular towers. The system unit can be programmed to either skip to step 4 of FIG. 5 or continue with step 3 of FIG. 5 after a specific number of failed attempts to obtain a GPS lock.

The Wi-Fi microcontroller scans the area to determine if any Wi-Fi access points are within range of the system unit in step 3 of FIG. 5. Any information that is detected is recorded in addition to the GPS lock information. If no Wi-Fi signals are detected, this is recorded. When one or more Wi-Fi signals are detected, the microcontroller can record the number of SSIDs detected and pertinent information to include the SSID, BSSID, signal strength as measured at the location of the system unit, and the encryption algorithm if any is used for each signal detected. Once the scan is complete, the Wi-Fi chip is disabled. Once the Wi-Fi is disabled the microcontroller can be placed into a sleep state for a specified period of time to conserve energy. Once a specific period of time has passed, the procedure can be run automatically again.

The Wi-Fi scanning procedure can be set to run at different time intervals or to be triggered by specific events. If no GPS lock was obtained, regardless if step 3 of FIG. 5 was skipped, when the system reaches step 5 of FIG. 5, the microcontroller can be placed into sleep mode for a shorter time period than if a GPS lock was obtained. Alternatively, if another program was active when the Wi-Fi scanning procedure was initiated, the system unit can be returned to the state it was in prior to initiation of the scanning procedure, to include the state of the microcontroller and the Wi-Fi chip. The Wi-Fi Scanning can be conducted as normal if no GPS lock can be obtained, proceeding with step 3 of FIG. 5, and upon reaching step 4 can continue to attempt to obtain a GPS lock. The Wi-Fi scanning procedure can also be used in combination with other procedures such as the data upload procedure described in FIG. 6.

The system unit, upon completing step 3 of FIG. 5 can initiate the data upload of FIG. 6. Certain steps can be skipped, such as step 1 of FIG. 6 and begin the data upload procedure with step 2 or with step 3(a)(i) of FIG. 6 if an open or known Wi-Fi access point is within range during the Wi-Fi scanning procedure. The microcontroller can continue to complete some or all of the data upload procedure steps and return to the Wi-Fi scanning procedure or to another program that called the routine.

FIG. 6 illustrates an exemplary method in which a system unit contains a programmed function for uploading data to a repository not resident on the system unit through a Wi-Fi connection. This function can be repeated periodically or triggered by events. In this embodiment, the system unit contains Wi-Fi capability and programming for detecting and connecting to Wi-Fi access points the system detects. Generally, Wi-Fi connectivity is turned off to conserve power; this however is not mandatory. The system unit attempts to obtain a GPS lock upon initiation of the upload process. If a GPS lock is not initially obtained, the system can re-attempt to obtain a GPS lock. Programming can set a specific number of attempts after which the system aborts the upload procedure. The system can record it was unable to execute the upload procedure and record any pertinent information regarding the failed attempt. The next time the system unit completes an upload procedure, it can be programmed to provide the information regarding any of the previous failed upload attempts in addition to the information to be uploaded at that time.

Alternatively, if the system cannot obtain a GPS lock, the system can be programmed to continue with the upload procedure, moving to step 3 of FIG. 6. The microcontroller initiates the Wi-Fi capability. The system unit scans for any Wi-Fi signals and access points within range of the system unit. If detected, the system unit can connect to any open or known access point to conduct the upload. Known access points are access points the system unit has access credentials. Once a Wi-Fi connection is established, the microcontroller reads the data to be uploaded from the memory storage unit or other components and uploads the data to a non-resident storage area or website. If a GPS lock was not established, the system unit can provide any available information and indicate it was unable to establish a GPS lock. Once the upload is complete or if no open or known Wi-Fi access points are in range, the system unit can continue to step 4 of FIG. 6 and disable the Wi-Fi capability and continue to step 5 of FIG. 6 and place the microcontroller into a sleep mode to conserve power until another upload procedure or function is initiated.

As an alternative or additional step, if the system is unable to establish a Wi-Fi connection, the system unit can attempt to establish communications connection using another component or protocol, such a cellular connection, to upload data to the internet. Changes to the procedure contained in FIG. 6 would be to steps 3 and 4 such that the specific protocol component was enabled as opposed to a Wi-Fi component. The procedure outlined in FIG. 6 can be repeated as many times or as often as needed.

Certain steps of exemplary procedures can be omitted for any reason. The microcontroller need not be placed into a sleep state upon completion of upload. Alternative to step 5 in FIG. 6, if another program was utilizing the microcontroller prior to the upload procedure being initiated, the system unit can return the microcontroller to the state it was in prior to initiation of the data upload procedure. The system unit can also be designed to initiate an action to upload data based upon events instead of specific time periods. In this embodiment, the microcontroller can optionally be placed into a sleep mode to conserve power while sensors continue to function or to allow the microcontroller to continue in a normal functional state while executing other programs. Sensors that do not require the function of the microcontroller can include sensors such as a thermometer which can open or close a circuit based upon changes in temperature. This circuit opening or closing can initiate the microcontroller and/or trigger other programs to execute. Using small mechanical components can aid in extending the useful life of the power supply while adding additional functionality to the system.

A system unit can also download data in addition to uploading data. When an upload connection is established, the connection can be a standard two way connection to allow data to be communicated to the system unit. When a communication component or protocol is active, a system unit can be communicated to through the appropriate means. This can include automatic download of instructions each time the system unit detects an open or known Wi-Fi connection; a Bluetooth™ connection or other wireless data connection. Alternatively, communication components can be activated remotely on a system unit. A system unit that includes cellular communications capabilities, or other communications capabilities that include a standby receive mode, can be in such a state to await incoming communication requests that active the component and the system unit. When a connection is established, the system unit can receive data, programming, or control signals that are downloaded to the system unit. Establishing an incoming communication request can also activate other components, functions, or procedures. Activated functions or procedures can include the contacted system unit to request a GPS lock, record the time, date, and location of the system unit when the incoming communication request is received, or activate a data upload via the same method or different medium as the incoming request.

Figure 7:
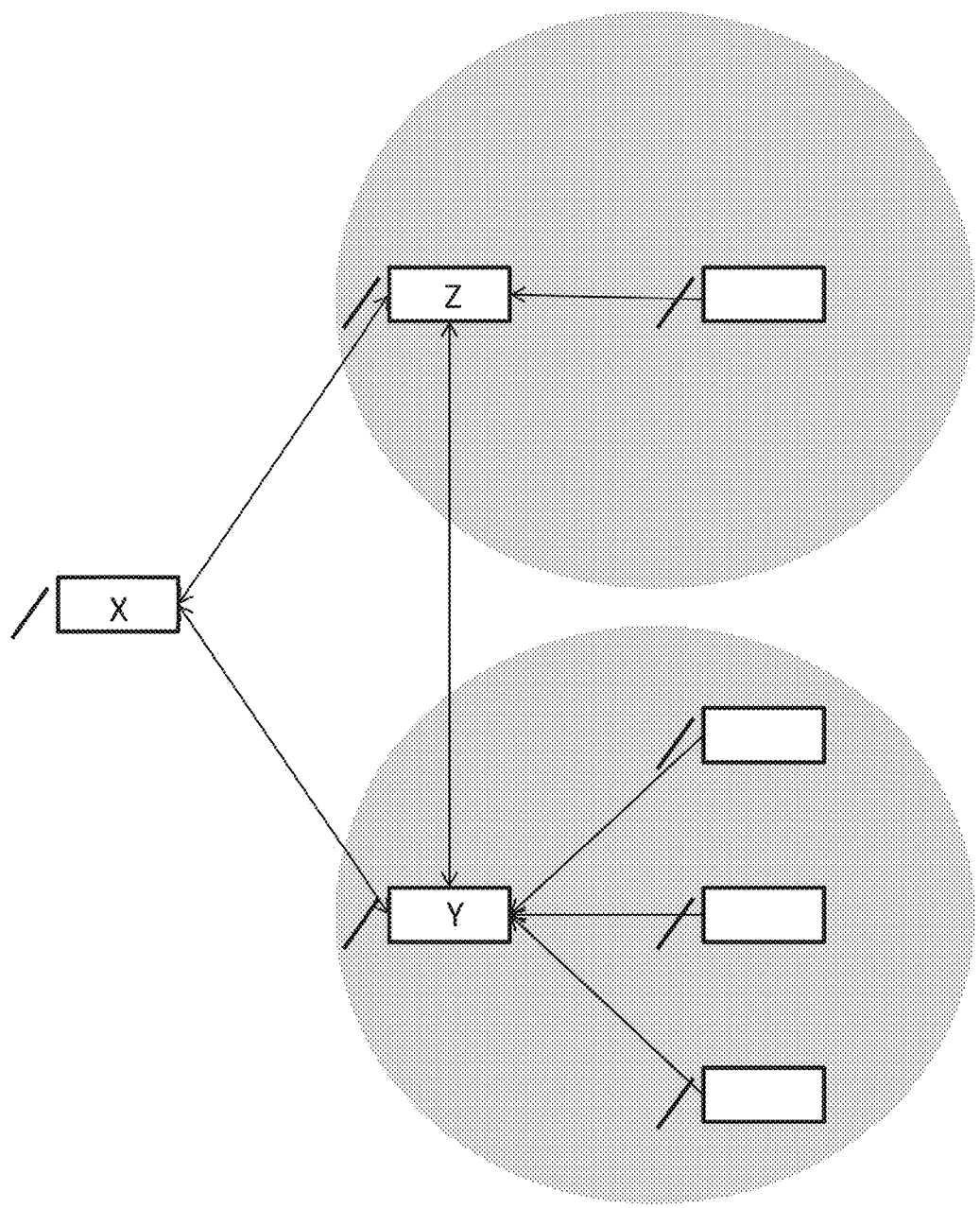
FIG. 7 illustrates an example three tier configuration of system units.

System units can interact with each other. A system unit can be programmed to detect another system units and establish communication channels or execute other functions upon detection of another system unit. The system units can interact and exchange information between each other and/or notify the user(s) and as such are not limited to interacting with external, non-system unit devices. Information that that can be communicated between system units can include how close two units are, relative bearing of the units, relative motion of the units or data contained on a system unit. The exchange of information can be programmed to be unidirectional with respect to some sets of information or bi-directional with respect to other information. System units can be programmed with hierarchical relationships such that specific units will request or provide certain information and others will provide responses to the requests. FIG. 7 illustrates an exemplary three tier configuration of system units. The top tier is a senior system unit X, the middle tier comprises two area system units Y and Z. Each area system unit can have one or more subordinate system units. At times an area unit may have no subordinate units within its area. When a system unit enters the area or with a certain proximity of an area unit, the subordinate units provide preprogrammed information or information requested by the area unit to the area unit. The area units can communicate with other area units or with units higher in the hierarchy in this example. Alternative configurations can be used depending on requirements. Multiple components can be used to exchange information and information can be sent by one method or medium and received by the same or different method or medium. The microcontroller can select which communications protocol and components to use. Communication means can be based on energy efficiency, security needs, or means available if one is not functioning properly. For example, data can be transmitted via Wi-Fi at longer distances but when in closer proximity, Bluetooth™ or NFC can be used instead. Alternatively, the microcontroller can be programmed to communicate specific data or execute specific programs only when specific communication methodologies are available.

Figure 8:
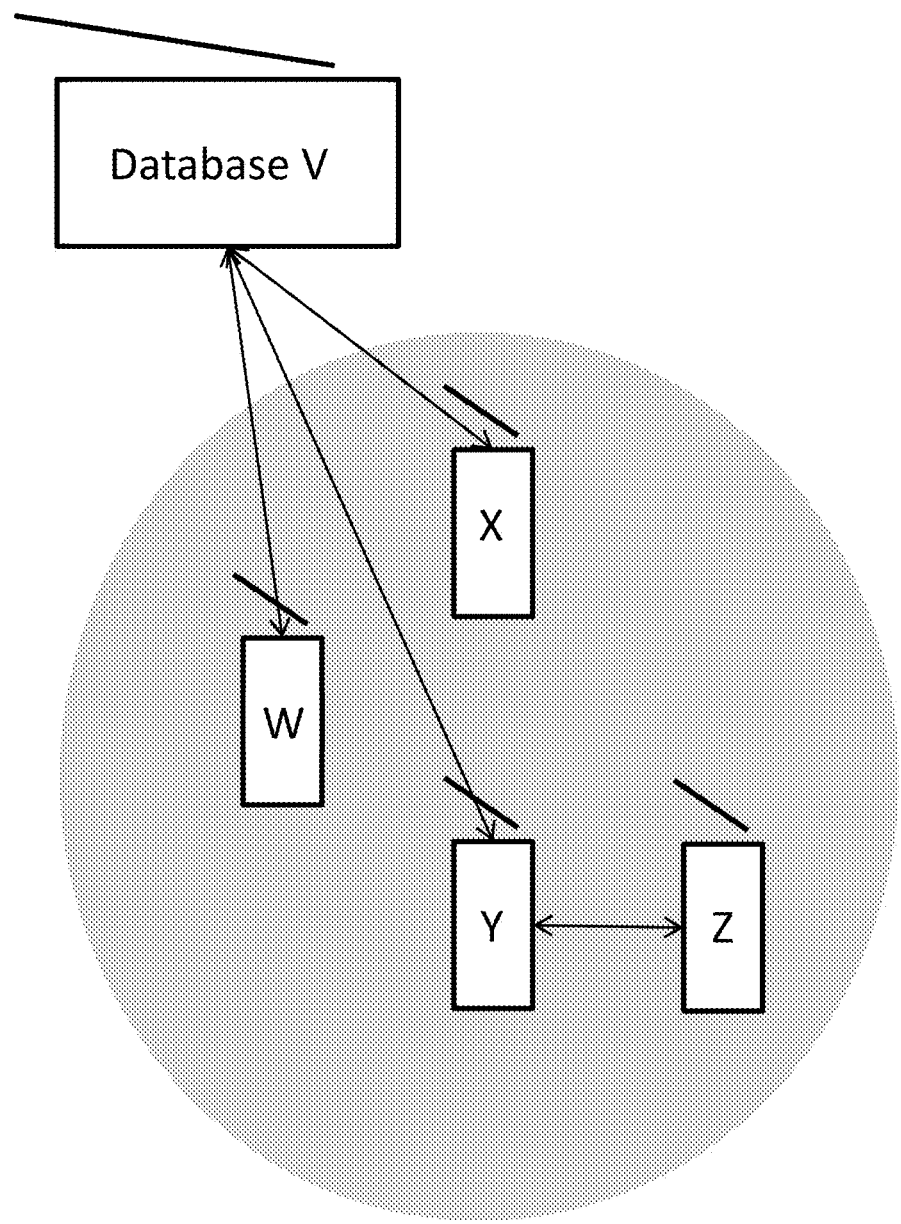
FIG. 8 illustrates an example use of units as a relay to reach other units.

Communication between units can be used as a relay to reach units that other methods cannot use. If a communication attempt is made to a specific unit, system unit Z in FIG. 8, but it cannot be reached directly, a request can be sent to other units in an area that system unit Z was last known to be in. These units can then attempt to contact system unit Z through the same or alternative communications methods. An example can include establishing a cellular data connection from database V to system units W, X, and Y which are near the last known location of system unit Z. Each of these units then attempt to reach system unit Z via Wi-Fi. If another system unit, system unit Y, establishes connection with system unit Z, system unit Y can act as a relay for direct communication between database V and system unit Z. Similarly, a location request for a unit can be sent out and units that can communicate with a unit unable to receive direct communication can forward the request(s) and communication responses or can triangulate a unit if they are able communicate with it.

FIG. 9 and FIG. 10 demonstrate similar procedures for using system units to communicate with other system units or devices to access information. FIG. 9 demonstrates how a website can be loaded onto a system unit and users can then access the data on the portal system unit. This allows the system unit to act as a Wi-Fi access point with one or more websites contained on the system unit. As other system units that are programmed to connect to the portal system unit come within a define range of the portal system unit a connection between the units can be established. This connection can be established automatically or with input from a user. Alternative devices with Wi-Fi, Bluetooth™, NFC, or other wireless connection capabilities, such as smart phones or tablets, can also be used to connect to the portal unit. During connection establishment, the portal unit can optionally require a password or user credentials to allow a connection. Alternatively, a portal unit can allow connection without requiring any credentials. Once a connection is established, the portal unit can request specific information, such as an e-mail address, user ID, or other information to allow access to the website contained within the system unit. Depending on the contact information provided, such as an e-mail address, or telephone number, the system can provide different information. If the contact information provided does not match a valid format, it can be re-requested or access can be denied. Once valid information is provided access to data on the website can be provided. If the contact information matches that of a pre-registered user or repeat user, the portal unit can provide one set of information, while if it is a new user the portal unit provides different information or can request additional information prior to allowing full access. Information that is provided by the portal unit to a user can also depend on the order that a user connects to the portal device. For example, the first ten users receive a certain set of data or coupons and all other users receive a different data set.

If there is no activity within a set period of time or the devices move too far apart, the connection can be timed out. Multiple connections can exist between a portal unit and other system units or devices at the same time.

FIG. 10 demonstrates a function similar to FIG. 9, however, the majority of the data is stored at a pre-configured offsite database or website. The system units provide a relay function for access to the offsite database. The database is pre-configured to perform certain actions. The relay system units are enabled in a similar fashion as discussed in for FIG. 9 with the additional step of establishing a connection to the offsite database. Alternatively, the connection to the offsite database can be established each time a device connects to a relay system unit and the device or relay system unit requests data from the offsite database. In FIG. 10, the data to be provided is generally located on the offsite server.

Some data may be resident on the relay system unit. The relay system unit may request information from the device connecting to the relay system unit prior to providing access to the offsite database. Using an external database and connections to it allows for increased data storage and conserving power on relay system units. In this configuration, a relay system unit can receive data from a device, save the data to the relay system unit, and upload saved data periodically to the offsite database in bulk. Alternatively, a relay system unit can work as a direct relay for communication between a system unit or device the relay system unit is connected to and through it the offsite database, system unit or device.

System units can be programmed to execute functions based on location. The microcontroller can be set active inside or outside of a geofenced area. Geofenced areas can be programmed to a system unit and saved on the memory storage unit. The geofenced area can be established or maintained through a GPS unit or through other location determination such as through accelerometers, Wi-Fi, cellular or other components contained within the system unit. A geofenced area can also be programmed in a central database that informs system units if they are within a geofenced area when a system unit contacts the central database. Once a system unit enters or leaves a geofenced area, the system unit can execute one or more functions or continues to execute functions until the unit leaves the geofenced area. Alternatively, the system can be set to stop executing functions based on a geofenced area. Based on the location of a system unit, it can change from one function to another. An example is where a system unit within a specific geofenced area operates under FIG. 10 as a relay unit, but once outside of the geofenced area, changes to operate as a portal unit as illustrated by FIG. 9 or attempts to upload data under guidelines contained in FIG. 6.

The system can be used as a navigation tool and for locating items. Within a set area such as a geofenced area that outlines a store or a shopping center, the GPS location or facility-based beaconing signal devices can be used to assist in tracking the movements of a system unit. The facility-based beaconing system can be a Wi-Fi system that covers the desired. As a system unit enters this area, the system unit can automatically connect to the Wi-Fi as a trusted or open Wi-Fi network if the system unit is running any other application. The system unit can also have an application loaded that recognizes the particular Wi-Fi network within the geofenced area and continues to run an application for the specific location. This can include reporting the location of the system unit to the Wi-Fi network it is connected to in addition to the location reporting the system unit conducts for the user. It can also activate routines which trigger advertisements or directions to be provided to the user of the system unit as they move throughout the area. These can be triggered when a system unit comes within a certain distance of a sign, the sign can display a message to the system user. Alternatively, as the system unit approaches locations, the system unit, can notify the user of a direction to follow, such as to turn right.

The system unit can also provide information upon reaching locations. Upon reaching a destination, the destination can be a specific physical location or coming within a specified distance of an object the system unit can relay information to the user. This information can be an advertisement as a user proceeds within a set distance of a shelf with a product on it. Alternatively, if the user is in a museum, as they approach an exhibit, the system unit can link to the exhibit information and provide it to the user. In either case, the system unit can accomplish the task through various means. One method is for the system unit to have a speaker component that it activates to notify the user. Alternatively, a display unit such as scrolling text or a screen can provide the information or advertisements. The system unit can connect with the facility-based system to trigger displays, ticket/coupon dispensers, lights or other devices as the system unit approaches them. As the system unit moves away from these locations, the facility-based system can be set to take other actions, such as turn off the lights, or remove the display of the coupons.

A central database can track the location and movements of a system unit. This can be used in combination with applications to determine the patterns of a system unit user. This can allow targeted advertising to the system unit user. In an example where an application for a grocery list is used by a system user to help find items in a store, the application can link with the store facility-based system in order to provide the location information of the items sought, this list needs to be provided to the facility-based system which can offer advertisements for store branded alternatives for the same items in addition to providing directions to where the listed items are. A database can compile information to include where the system unit user goes on each trip and how often trips are made. This information can be used to develop profiles to help better advertise to customers or by the retailer to help rearrange products to help increase sales of products.

Additional peripheral items such as drones, robots, advertising banners, radio control vehicles, animal collars, lanyards, or ID holders can be available for purchase such that the microcontroller solution can be flashed into the appropriate configuration, placed into one of those peripheral devices, and be able to control those peripheral devices using the flashed configuration. Specialized form factors such clothing, hats, or belts can also be available and could be fully flashable as well. In providing the centralized location of applications, specialized form factors, and the specific peripherals, the microcontroller solution can provide a myriad of uses from one solution.

Example Embodiments

The system can be used for numerous different user categories such as pet owners, first responders, military personnel, or for conferences, advertising, agricultural uses, and in smart clothing. The system allows users to easily use an IoT device. Example embodiments of the system unit include: uploading recorded data to the internet, including text, pictures, music, and files; downloading data from the Internet; performing network security functions such as scanning a particular network for vulnerabilities or unauthorized hosts or users; tracking certain objects including pets and personal property; performing certain tasks when in the presence of a known Wi-Fi Hotspot such as uploading current coordinates, or posting to social media; attaching LEDs to the collar and having the microcontroller turn those LEDs on and off in a pattern determined by the programmer.

One embodiment includes a mobile form factor scanning device for Wi-Fi enabled devices. This unit can be configured to collect information such as date, time, latitude, longitude, and information about wireless signals and access points including SSID, BSSID, signal strength, and encryption algorithm each time a Wi-Fi signal is detected. For example, this same unit could be integrated into a hat worn by a security officer, or on the collar of a guard dog, that would allow for collection of this data as the guard conducts his rounds. A penetration tester can also use this embodiment to conduct security penetration testing of a network by providing a lanyard that houses a system unit to employees or guests without need to provide specific further instructions.

Another embodiment can be used for tracking a mobile target using wireless connections. When the system unit comes across a known or open Wi-Fi Hotspot, it would connect to that hotspot and upload its current GPS location and the previously recorded GPS data and time information and/or other data to the Internet utilizing a pre-configured website address and credentials. If the unit included cellular data capability, the unit could periodically post the location of the unit or other pertinent data to the Internet through this communications medium. A pet owner or researcher could retrieve the information. The information could then be utilized by a software program to graphically display the activities of the target. There may be a website where the pet owner could download new software programs and place those programs onto the unit to change the behavior of the unit.

In yet another embodiment, a system unit can be used to track the location of luggage and to post that information to the Internet. In some embodiments of the luggage tracker example, a system unit can contain accelerometers to monitor how the luggage is handled. The system unit can periodically obtain a GPS lock and attempt to connect to a known or open Wi-Fi access point. Once access to the Internet is gained, the unit would utilize a preconfigured website or social media credentials to post the current location of the luggage, this can include GPS location or provide, an airport location if geofencing is enabled. A user can then utilize an Internet-capable device to login to the website or social media and check on the current location of the luggage.

In a further embodiment can include tracking another system unit. A group of people could attach a system unit to one of the members of the group (called the "rabbit") that provides location information to other system units that a part of the group. The system unit could utilize its GPS and/or accelerometer location tracking capabilities of the unit carried by the rabbit to provide location updates at specific intervals or upon entering or leaving locations. It would then be the job of the other members of the group to attempt to catch the rabbit at a particular location or predict the location that the rabbit would frequent next. If the chase group failed to catch the rabbit, then the members of the group could be required to perform a penalty action prior to continuing the chase. In this situation, the system unit used by the rabbit could be set to change how often it reports information to the chase group based upon how close the chase group is to the rabbit.

In another embodiment system units can be set to provide or gather information when each unit establishes a communication link with another system unit or device, such as a smart phone, tablet, or computer. A product advertising firm or company can host an event to promote their product using this capability. Prior to the event, the promoting company provides each of their representatives with a system unit integrated into a lanyard to be worn by the representatives that contains a customized, pre-configured website in the memory storage unit. Using this solution, the firm can create customized websites containing coupons, pictures, and promotional material stored on the microcontroller locally. This will help protect proprietary material and will ease control and distribution of the lanyards to the appropriate representatives. This also allows each of the representatives to have customized content in different locations at the same event. The content accessed by each customer using different mediums could have different content provided to them. In this embodiment, the system units used by the advertisers may require pre-configuration of the website to be displayed.

Another example use of the embodiment where system units provide and/or gather information, is to use each system units that communicate with a pre-configured database that is hosted offsite. Each system unit can communicate and pull information from the offsite database. At a job fair, example information can include job listings, documentation required for each position, and hiring manager contact. As applicants visit employer booths, they can view company information and job lists similar to how a user could view promotional advertising information in the previous example. The system units can also communicate information to the database such as accepting an applicant resume and forwarding it to the database and including pertinent information. The applicants can then provide their contact information or, if they choose, additional data through the system unit when they meet with representative. In this embodiment, the system unit that accepts information from the user can be set to record what information it received, when and where the information was received and which representatives wore the unit, and to retain the information on the system unit or immediately forward it to the offsite database. This can be used to compare effectiveness of recruiters or representatives. Similarly, it can be used to build statistics on sales representatives, what they sell, when sales are made, and correlate that data with data received from the customers without having to ask the customer to provide information verbally or through other methods.

In a further embodiment, system units are programmed to maintain a specific distance from each other, and if the distance is exceeded, to the unit that is removed from the group executes specific instructions. This embodiment can be used by people in a crowded event attempting to find their group if they are separated. Units can be set to help direct users to each other, or to a location. This embodiment can also be used to maintain an appropriate separation between representatives at events. Alternatively, this embodiment can be used for tracking animals in a herd or where one strays away from the herd. When an animal strays, a program can be executed by that system unit that sends a request that actives a drone outfitted with a system unit. The drone then tracks down and follows the wayward animal and can be programmed to steer the animal back towards the herd, such as by activating a shock collar worn by the animal if the animal continues to move away from the herd.

Figure 2:
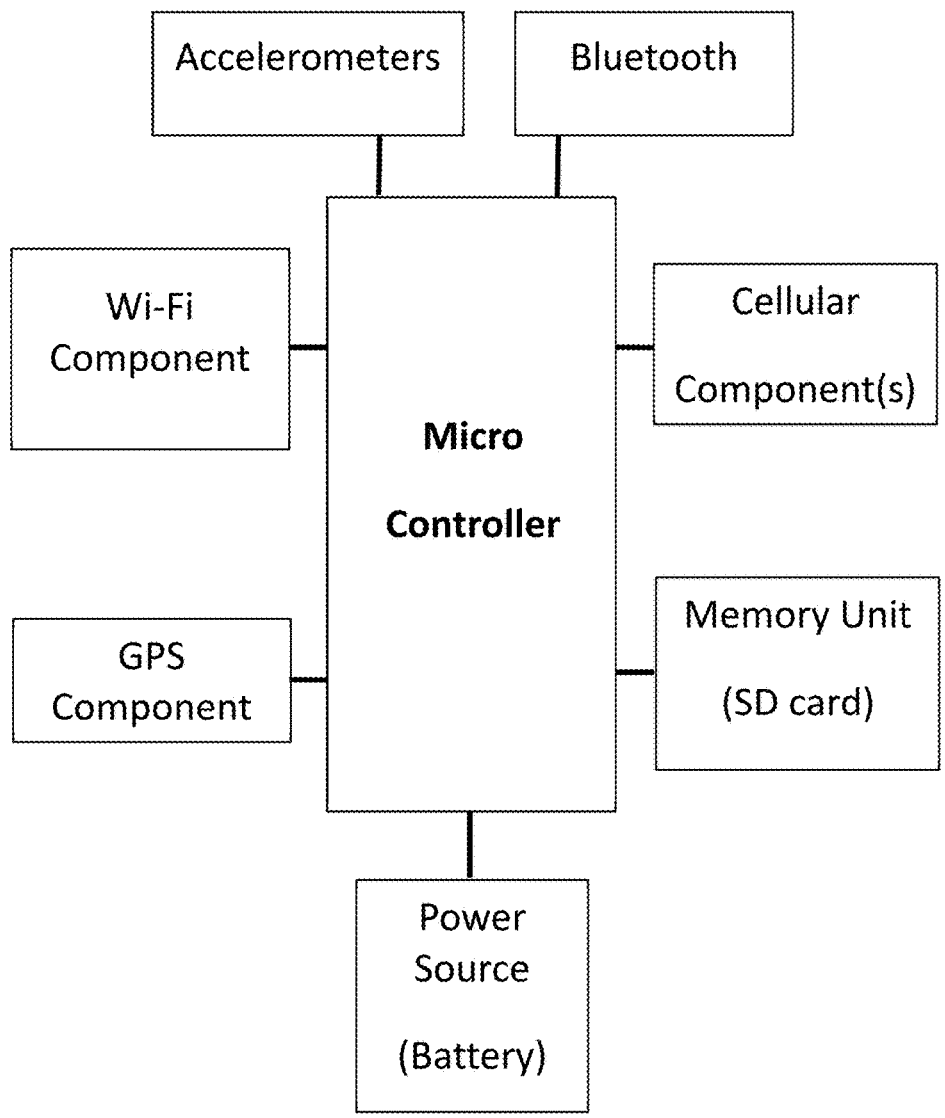
FIG. 2 illustrates an example construction of the portable system unit utilizing a microcontroller.

In another embodiment, system units could be utilized at a public event, such as a fair, where visitors are outfitted in shirts or other garments that have units embedded in them. Rather than carrying tickets for events, such as ride rides or games, the unit can be registered with the facility, such as a park, upon entry and associated with a credit card or other payment account. When the visitor enters a ride, the attendant scans the shirt of the visitor to gain entry. This will allow the visitors to use the facilities without having to keep track of tickets or cards System Architecture The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions. Example computerized systems for implementing the invention are illustrated in FIG. 1 and FIG. 2. A processor or microcontroller can be configured to particularly perform some or all of the method described herein. In some embodiments, the method can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computing system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, Android™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the registers of a computing system and/or memories into other data similarly represented as physical quantities within the memories of a computing system, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What is claimed is:

1. A method for using a small, mobile, programmable computing device comprising a programmable microcontroller functionally connected to a common communications module, a GPS unit, and a memory unit, said method comprising the steps of:
    hiding the computing device within a wearable item worn by a user of the computing device;
    using the GPS unit, attempting to obtain a GPS lock in order to determine geographic location of the device;

i. when no GPS lock is obtained repeating the step of attempting to obtain a GPS lock until a GPS lock is obtained;
ii. when, a GPS lock is obtained, determining the geographic location of the device;
enabling the communications module after a GPS lock has been obtained, thereby conserving power consumed by the communications module;
using the communications module, scanning for proximate communication access point signals;
gathering data from at least one proximate communication access point, said data comprising date, time, location, signal strength, and identity of any encryption algorithm used by the access point;
uploading said gathered data plus the geographic location of the device through the communications port to at least one of an external repository and the memory unit;
loading a Website onto the computing device;
programming the computing device to act as a Wi-Fi access point accessible to external computers;
enabling the computing device to communicate wirelessly with at least one external computer within a pre-defined geographical range of the computing device; and
allowing a developer to reprogram the computing device to perform at least one of a plurality of functions, said functions limited only by physical constraints of the computing device's hardware components.

2. The method of claim 1, where the step of determining geographic location of the device is repeated upon the occurrence of:
a preset distance has been traveled by the device;
execution of a location repeating program is performed by the microcontroller: or
a sensor coupled to the device initiates the repeating.

3. The method of claim 1, wherein, after the scanning step, the following additional steps are performed:
disabling the communications module; and
placing the microcontroller into a deep sleep mode to conserve power.

4. The method of claim 1 further comprising the step of programming the microcontroller, said programming using at least one programming technique from the group of techniques consisting of: drag and drop, selection from a list, and using custom user developed code.

5. The method of claim 4 wherein the programming step comprises the user uploading software code to a central database or local computer coupled to the computing device.

6. The method of claim 1 further comprising the communications module establishing communications using one or more of Bluetooth a Wide Area Network protocol, cellular, and Near Field Communication.

7. The method of claim 1, wherein:
communication access points are detected using a Wi-Fi protocol; and
for each detected Wi-Fi access point, the memory unit records date, time, location, SSID BSSID, signal strength, and identity of any encryption algorithm used by the Wi-Fi access point.

8. The method of claim 1, wherein the device reads pre-selected categories of data from the memory unit and uploads the data to an external storage unit whenever an open or known communication access point is detected.

9. The method of claim 1 wherein the user is a non-human animal, and the wearable item is an animal collar.

10. The method of claim 1 wherein the comp ting device comprises a Web server.

* * * * *